United States Patent
Zimmermann et al.

(10) Patent No.: US 11,061,897 B2
(45) Date of Patent: Jul. 13, 2021

(54) MATERIALIZABLE DATABASE OBJECTS IN MULTITENANT ENVIRONMENTS

(71) Applicant: SAP SE, Walldorf (DE)

(72) Inventors: Andreas Zimmermann, Waibstadt (DE); Volker Driesen, Heidelberg (DE); Markus Gebhard, Karlsruhe (DE); Torsten Ziegler, Dielheim (DE); Frank-Martin Haas, Wiesloch (DE)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 15/973,147

(22) Filed: May 7, 2018

(65) Prior Publication Data

US 2019/0340282 A1   Nov. 7, 2019

(51) Int. Cl.
*G06F 16/2453* (2019.01)
*G06F 16/22* (2019.01)

(52) U.S. Cl.
CPC .... *G06F 16/24539* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 2007/0156849 A1* | 7/2007 | Becker | G06F 8/65 709/219 |
| 2012/0041988 A1 | 2/2012 | Driesen | |
| 2013/0238555 A1 | 9/2013 | Driesen et al. | |
| 2014/0114913 A1 | 4/2014 | Engelko et al. | |
| 2016/0098438 A1 | 4/2016 | Eberlein et al. | |
| 2016/0232197 A1* | 8/2016 | Vaquero Gonzalez | G06F 3/067 |
| 2017/0116296 A1 | 4/2017 | Specht et al. | |
| 2017/0123787 A1 | 5/2017 | Burkhardt et al. | |
| 2017/0161291 A1 | 6/2017 | Specht et al. | |
| 2017/0286467 A1 | 10/2017 | Eberlein et al. | |
| 2017/0344362 A1 | 11/2017 | Burkhardt et al. | |
| 2018/0052620 A1 | 2/2018 | Driesen et al. | |

(Continued)

FOREIGN PATENT DOCUMENTS

EP   3567488   11/2019

OTHER PUBLICATIONS

Aulbach, "Schema Flexibility and Data Sharing in Multi-Tenant Databases," PhD dissertation, Technische Universität München, 2011 (134 pages).

(Continued)

*Primary Examiner* — Giuseppi Giuliani
(74) *Attorney, Agent, or Firm* — Klarquist Sparkman, LLP

(57) ABSTRACT

Techniques and solutions are described for facilitating the distribution of tables and table data between a shared container and one or more tenant containers. The tables can include a sharing indicator that can designate a table (or a view on a table) as having a materializable type. Materializable types can initially be deployed in the shared container, and a tenant container can have read access to the table via a view. If the tenant attempts to modify the materializable table, the table can be materialized in the tenant container. Metadata for a materializable table can include materialization instructions. Techniques and solutions are also provided for converting between sharing types, and for updating shared containers or table schemas.

20 Claims, 12 Drawing Sheets

(56) References Cited

U.S. PATENT DOCUMENTS

| | | |
|---|---|---|
| 2018/0096013 A1 | 4/2018 | Warshavsky et al. |
| 2018/0136913 A1 | 5/2018 | Mayer et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0232382 A1 | 8/2018 | Mayer et al. |
| 2018/0268154 A1 | 9/2018 | Specht et al. |
| 2018/0285097 A1 | 10/2018 | Radermacher et al. |
| 2018/0329702 A1 | 11/2018 | Eberlein et al. |
| 2018/0336022 A1 | 11/2018 | Eberlein et al. |
| 2018/0373767 A1 | 12/2018 | Specht et al. |
| 2019/0007420 A1 | 1/2019 | Eberlein et al. |
| 2019/0018874 A1 | 1/2019 | Eberlein et al. |
| 2019/0129985 A1 | 5/2019 | Schlarb et al. |
| 2019/0129986 A1 | 5/2019 | Birn et al. |
| 2019/0129988 A1 | 5/2019 | Auer et al. |
| 2019/0129990 A1 | 5/2019 | Auer et al. |
| 2019/0129991 A1 | 5/2019 | Auer et al. |
| 2019/0129997 A1 | 5/2019 | Auer et al. |
| 2019/0130010 A1 | 5/2019 | Auer et al. |
| 2019/0130121 A1 | 5/2019 | Birn et al. |
| 2019/0340260 A1 | 11/2019 | Eberlein et al. |
| 2019/0356737 A1 | 11/2019 | Eberlein et al. |
| 2019/0370377 A1 | 12/2019 | Hauck et al. |
| 2019/0377820 A1 | 12/2019 | Kruempelmann et al. |
| 2020/0159852 A1 | 5/2020 | Meissner et al. |

OTHER PUBLICATIONS

Extended European Search Report, received in European Application No. 191727189, dated Jun. 28, 2019, 9 pages.

Office Action received in European Patent Application No. 19172718.9, dated Feb. 11, 2021, 11 pages.

Aulbach, "Schema Flexibility and Data Sharing in Multi-Tenant Databases," Dec. 5, 2011, retrieved from: https://mediatum.ub.tum.de/doc/1075044/document.pdf, 146 pages.

View SQL, Wikipedia, May 2, 2018, 3 pages.

* cited by examiner

| Object Name | Object Type | Tenant Range | Sharing Type | Materialization Flag | Materialization Process Flag |
|---|---|---|---|---|---|
| ABC | Table | 123-443 | W | NULL | NULL |
| DEF | View | NULL | R | NULL | NULL |
| GHI | Table | NULL | L | NULL | NULL |
| JKL | Table | NULL | M | 0 | 1 |
| MNO | Table | NULL | M | 1 | 0 |

| Materialization Flag |
|---|
| No |
| No |
| No |
| Pending |
| Yes |

| Stored Procedure |
|---|
| NULL |
| NULL |
| NULL |
| Create Table Temp... |
| Create Table Temp... |

| Stored Procedure Location |
|---|
| NULL |
| NULL |
| NULL |
| /stored_procedures/JKL |
| /client/stored_proc/MNO |

FIG. 5

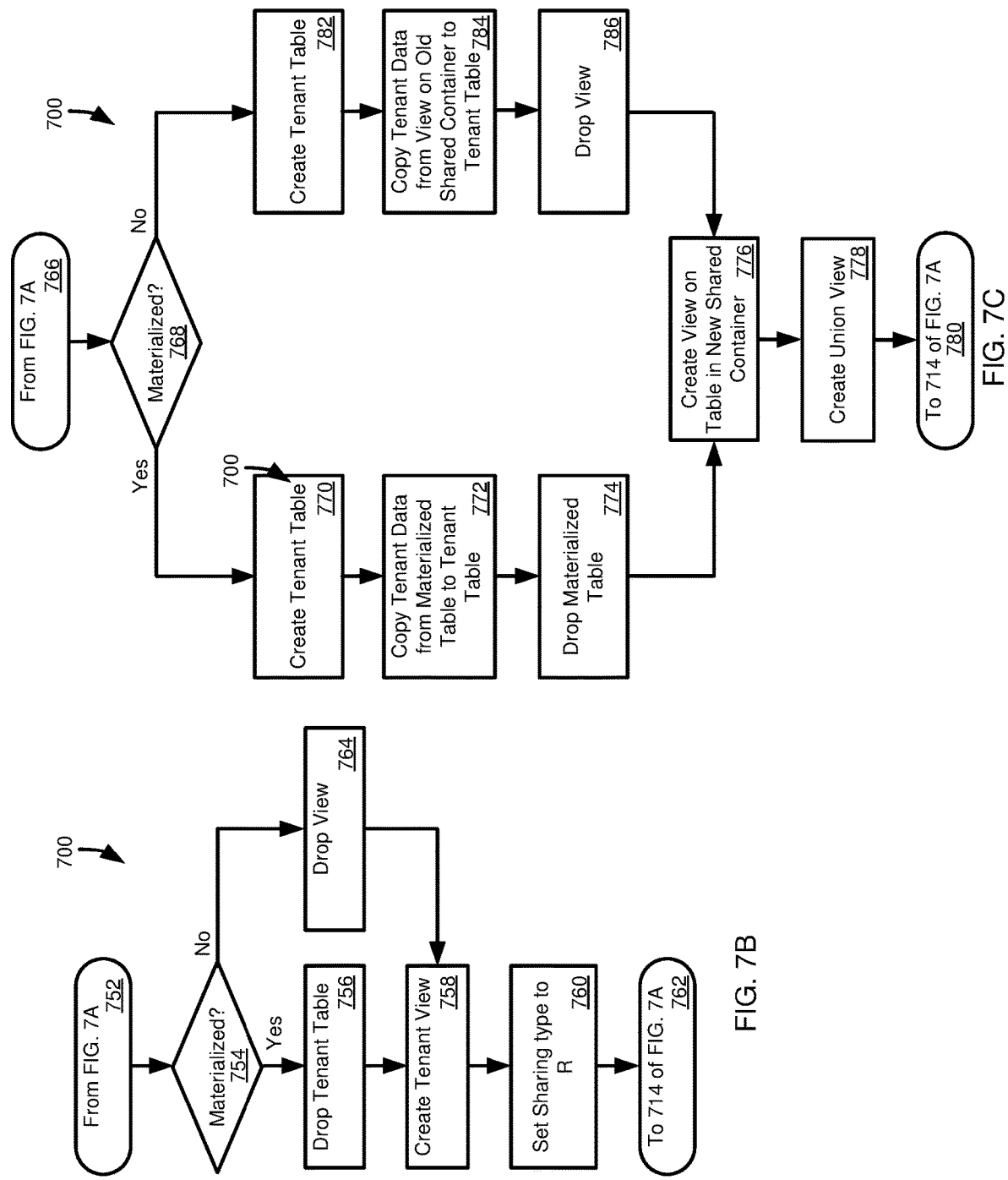

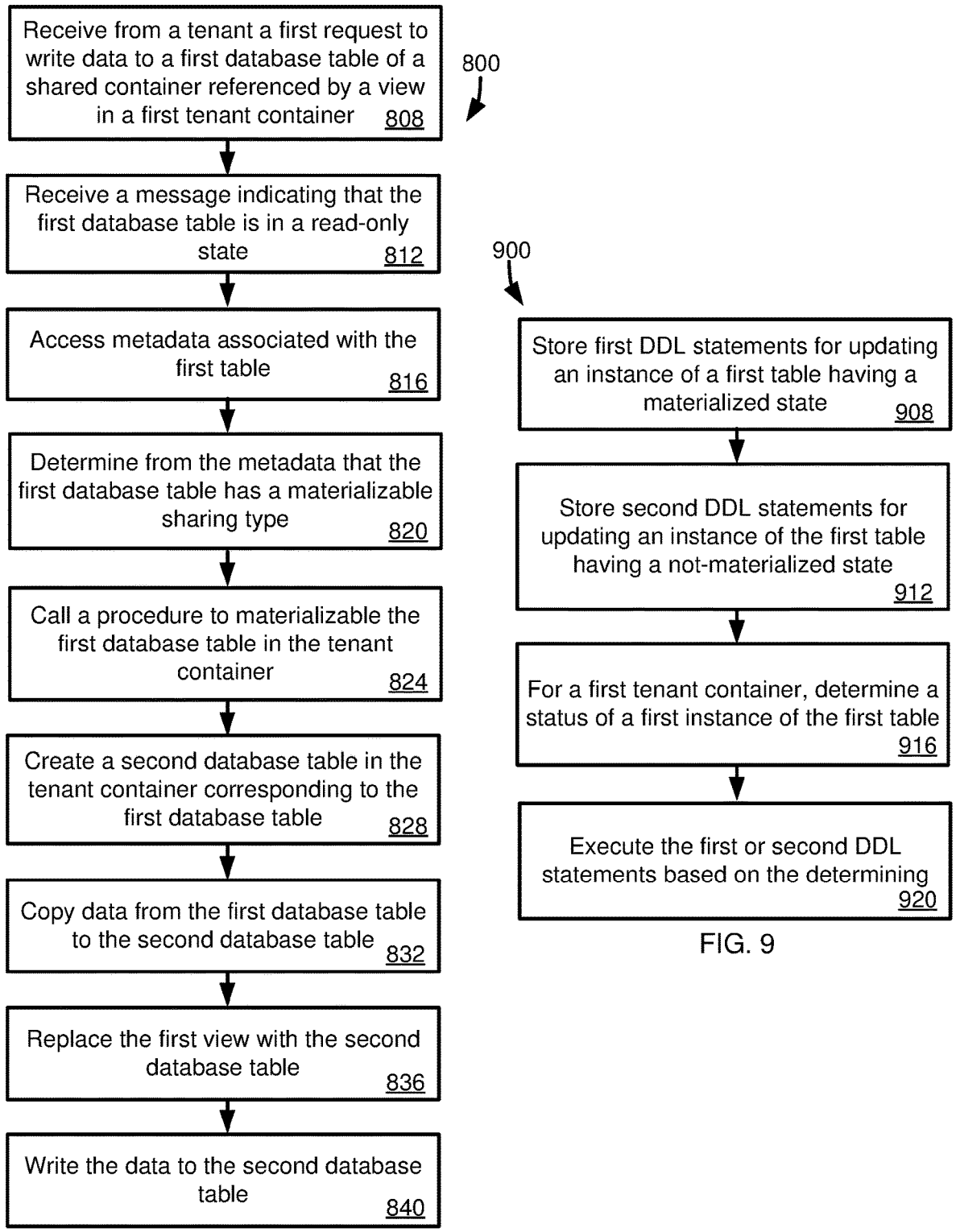

MATERIALIZABLE DATABASE OBJECTS IN MULTITENANT ENVIRONMENTS

FIELD

The present disclosure generally relates to managing tables in a multitenant environment. Particular implementations relate to managing how tables are distributed between a shared container, which can be used for multiple tenants, and tenant-specific containers.

BACKGROUND

Multitenant database systems are becoming increasingly common, particularly in cloud deployments. Multitenant environments can provide a number of advantages, including reducing hardware and maintenance costs for users (tenants). In a multitenant environment, some resources, such as documentation, a centralized code base, and at least certain runtime and configuration data, are typically shared by multiple tenants. However, other data is typically specific to individual tenants. Individual tenant data is typically not shared with other tenants, and may not be accessible to an administrator of a multitenant environment.

Similar scenarios may exist in other contexts. For instance, a large organization may have multiple systems (e.g., development, test, and production systems) that share resources (e.g., a software stack). Other components of the systems may differ, and thus can be analogous to tenants in a multitenant architecture. Similarly, a large organization may maintain common resources, but have distinct resources for particular regions, operating units, facilities, etc., which can be similar to tenants in a multitenant architecture. Room for improvement exists in managing multitenant database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the distribution of tables and table data between a shared container and one or more tenant containers. The tables can include a sharing indicator that can designate a table (or a view on a table) as having a materializable type. Materializable types can initially be deployed in the shared container, and a tenant container can have read access to the table via a view. If the tenant attempts to modify the materializable table, the table can be materialized in the tenant container. Metadata for a materializable table can include materialization instructions. Techniques and solutions are also provided for converting between sharing types, and for updating shared containers or table schemas.

In one aspect, a method is provided for materializing a table in a tenant container when a write request is received for a read-only data object of the tenant container. A request from a tenant is received to write data to a first database table of a shared container. The first database table is accessible to the tenant container using a view defined in the tenant container. A message, such as an error or exception message, is received indicating that the first database table is in a read-only state (e.g., the tenant container has read-only access to the first database table located in the shared container).

Metadata is accessed for the first database table, which can be metadata located on the tenant container for the view. In particular examples, the metadata can be stored in a data dictionary of the tenant container. It is determined that the first database table has a materializable sharing type (e.g., by inspecting a sharing type indicator for the view or table in the data dictionary). A procedure is called to materialize the first database table in the tenant container. In some cases, a materialization procedure can be stored in, or accessed through (e.g., by a path or location indicator), an entry in the data dictionary or other metadata repository. A second database table is created in the tenant container corresponding to the first table by executing the materialization procedure. Data is copied from the first database table to the second database table. The first view is replaced with the second database table. In a particular example, the first view can be dropped from the data dictionary and the second database table can be given the name formerly held by the view. The data is written to the second database table.

In another aspect, another disclosed method provides for updating a table schema of a table having a materializable sharing type. First DDL statements for updating an instance of a first table having a materialized state are stored. Second DDL statements for updating an instance of the first table having a not-materialized state are stored. For a first tenant container, a materialization status is determined of a first instance of the first table. The first or second DDL statements are executed based on the determining.

In a further aspect, a further method is provided for changing a sharing type of a materializable table. Metadata is analyzed for a first database object of a tenant container. Based on the metadata, it is determined that the first database object corresponds to a materializable table, such as being a materialized table or a view on a non-materialized table located in a shared container in a multitenant database environment. A sharing type is determined to which the materializable table is to be changed. One or more database objects are added to, or removed from, the tenant container to accommodate the change in sharing type. Metadata associated with a database object of the tenant container is updated to indicate the change in sharing type of the materializable table. Read and write requests for the tenant are processed based on the changed sharing type.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 5 presents an example metadata table that can include sharing type indicators, as well as indicators for whether a table has been materialized or a materialization process has been initiated.

FIGS. 7A-7C are flowcharts of operations for updating a database object of a tenant container, such as changing a sharing type of the database object or updating an object schema.

FIG. 8 is a flowchart of operations in materializing a materializable table in a tenant container.

FIG. 9 is a flowchart of operations in updating a schema of a table having a materializable sharing type.

DETAILED DESCRIPTION

Example 1

Overview

Figure 1:
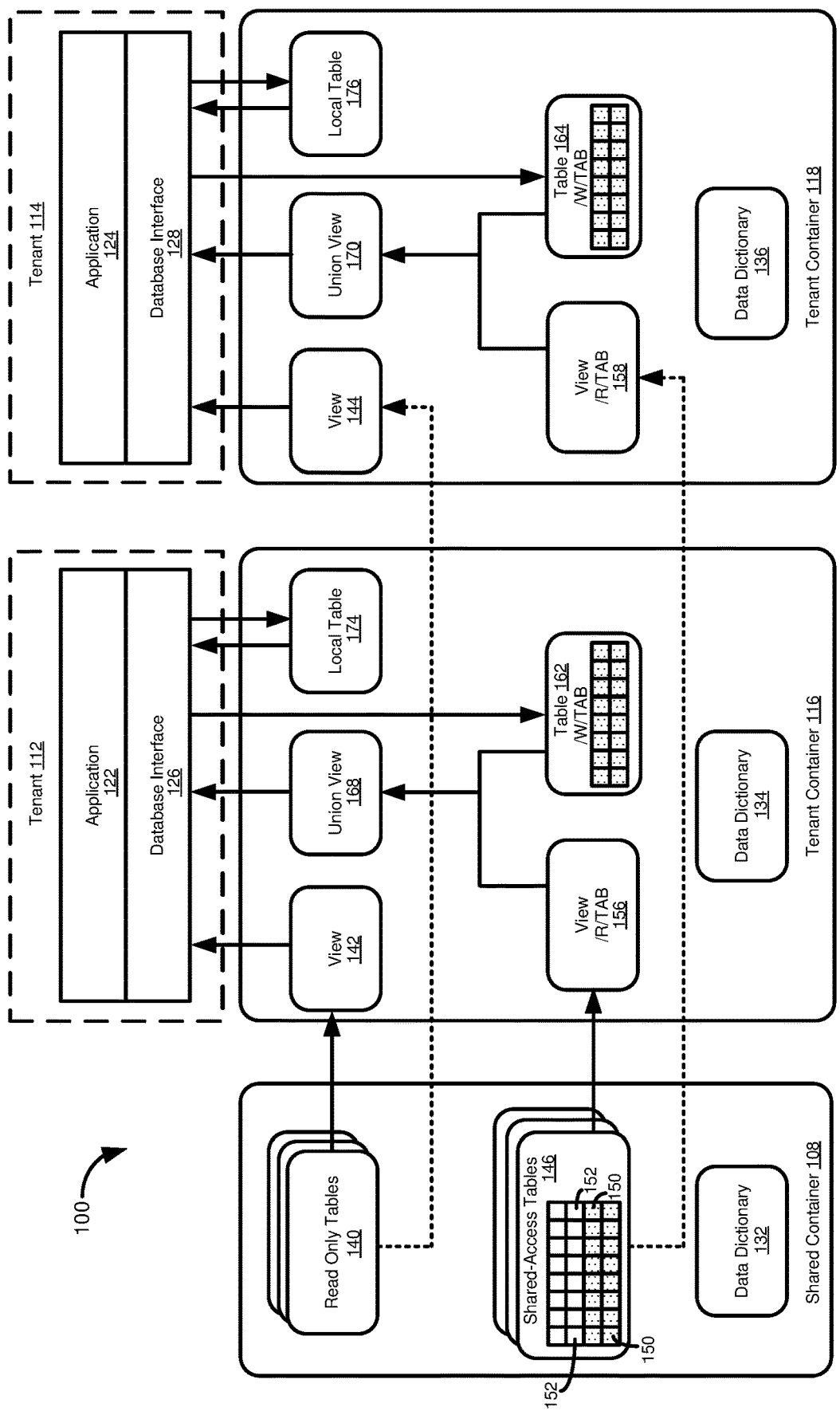
FIG. 1 is a diagram illustrating a multitenant database environment having a shared container and multiple tenant containers.

Multitenant database systems are becoming increasingly common, particularly in cloud deployments. Multitenant environments can provide a number of advantages, including reducing hardware and maintenance costs for users (tenants). In a multitenant environment, some resources, such as documentation, a centralized code base, and at least certain runtime and configuration data, are typically shared by multiple tenants. However, other data is typically specific to individual tenants. Individual tenant data is typically not shared with other tenants, and may not be accessible to an administrator of a multitenant environment.

Similar scenarios may exist in other contexts. For instance, a large organization may have multiple systems (e.g., development, test, and production systems) that share resources (e.g., a software stack). Other components of the systems may differ, and thus can be analogous to tenants in a multitenant architecture. Similarly, a large organization may maintain common resources, but have distinct resources for particular regions, operating units, facilities, etc., which can be similar to tenants in a multitenant architecture.

In many cases, it can be difficult to know what users will require particular database tables. Thus, a very large number of tables may be deployed in each tenant container, even though each tenant might only use a fraction of them. Similarly, it may be difficult to know how data should be shared between a shared system container and particular tenants, so data is just deployed to each tenant container in case a tenant might write to the table. This unnecessary duplication of data can mitigate the benefits of using a multitenant architecture. Accordingly, room for improvement exists.

Some database systems, including the HANA database system of SAP SE of Walldorf, Germany, provide tables that can have different sharing properties. For example, tables (or views on tables) can be designated as "read only," where a tenant can read data (if otherwise authorized) from a shared container, "local," where a table is available for both reading and writing in the tenant container, or "write" or "shared-access," where some data in a table is maintained in the shared container, and is read-only, and other data may be modified by a tenant. Tenant modifications can be stored in a table maintained in the tenant container. Thus, each tenant can have their own modified data. A union view can be created in the tenant container to read data from the local data and the data in the shared container.

"Read" and "Read/Write" data can be designated in various manners. For instance, key ranges can be defined for records or attributes having different permissions, SQL statements can be defined (e.g., having WHERE clauses), an object catalog can be maintained that includes owner information, or some other algorithm or technique can be used to identify differently permissioned data.

The present disclosure introduces a new sharing designator of "materializable." Materializable tables can be initially deployed to a shared container, such as a shared container in a multitenant environment. At least for appropriate tenants, or for all tenants, a read-only view of the table can be created. If the tenant attempts to write to the table or modify table metadata (e.g., via DDL statements, such as to add attributes to a table or alter other table metadata), an error may be generated, such as a SQL exception. The exception can be caught, such as by a database interface, and can trigger a materialization process. In the materialization process, a tenant-local copy of the shared table can be created. The tenant container can be modified to access the tenant-local table instead of the view. Techniques are also provided for handling updates of tables with a "materializable" type, and to change "materializable" tables to other sharing types.

The disclosed technologies can provide a number of advantages. By only copying tables to tenant containers when a tenant expressly indicates to write or modify table data can greatly reduce memory and secondary storage use. As views are typically only indicated by a catalog entry, the space taken for read-only access to the data is a small fraction of that needed to store the underlying tables, in the event a tenant does not access the data, or accesses the data in a read-only manner. However, the data can be made available for modification to the tenant on demand.

Stored procedures or scripts can be created and associated with the materializable tables. When it is determined that a tenant wishes to modify a materializable table, the stored procedure or script can be executed. Thus, the process of making data available for the tenant can be accomplished without manual intervention.

Similar procedures can be stored and activated for other types of database objects. For example, a synonym view on a tenant container that references a view in the shared container can be updated when one of the tables referenced by the view on the shared container is materialized to the tenant container. That is, the synonym view can be replaced by a view that references the materialized, tenant-local table and individual views for any remaining tables from the synonym view.

The use of views for materializable tables can also greatly simplify an upgrade process. That is, tenant-local tables can vary based on factors such as system version, system history, and extensions to tables that may have been created by a tenant. For these reasons, updates to tenant-local tables are typically configured for each tenant individually, which often must be done manually. In contrast, for materializable tables, statements to drop/add the appropriate views can be standardized and deployed with an update. Even if some materializable tables have in fact been materialized, or there are other tenant-local tables, the effort required to customize an upgrade for individual tenants can be greatly reduced.

Disclosed technologies also facilitate interconverting materializable table types and other sharing types. These processes can be facilitated with stored procedures or scripts that can be triggered automatically based on which type of conversion is indicated.

Example 2

Example Multitenant Environment

FIG. 1 illustrates a multitenant database environment 100. The environment 100 includes a shared container 108 that can be accessed by a first tenant 112 and a second tenant 114. Although first 112 and second 114 tenants are shown, an environment 100 can include a larger or smaller number of tenants.

The tenants 112, 114 are associated with respective tenant containers 116, 118. Each tenant 112, 114 is further associated with an application layer 122, 124 and a database interface 126, 128. The database interfaces 126, 128 can coordinate database operations, including execution of read and write requests from the tenants 112, 114. The database interfaces 126, 128 can also perform tasks such as handling execution errors, such as SQL exceptions, managing update processes, enforcing access restrictions or sharing permissions, copying data, adding, dropping, or rearranging data or database objects based on management activities (e.g., as part of an update, materialization process, sharing type change, etc.), or creating, removing, or altering relationships between database objects.

The shared container 108 and tenant containers 116, 118 can each include respective data dictionaries 132, 134, 136. The data dictionaries 132, 134, 136 can include entries for database objects in a respective container, and associated metadata. For example, the data dictionaries 132, 134, 136 can store table definitions, including attributes, attribute datatypes, sharing types, and other metadata. Similarly, the data dictionaries 132, 134, 136 can store view definitions, including underlying tables and operations (e.g., SQL operations) to retrieve particular data from such tables.

The data dictionaries 132, 134, 136, or another component, can include stored procedures or scripts that can be executed when requested or upon the occurrence of a triggering event. The data dictionary 132 of the shared container 108 can include metadata indicating whether a particular tenant 112, 114 is allowed to access particular tables of the shared container. In addition, or alternatively, any database object to which a particular tenant 112, 114 should not have access can be omitted from the data dictionary 134, 136 of the respective tenant container 116, 118.

The shared container 108 can include one or more (a plurality, as shown) of read-only tables 140. Typically, at least a portion of the read-only tables 140 can be accessed by the tenants 112, 114. For example, the tenant containers 116, 118 can include views 142, 144 (which can be defined in the data dictionaries 134, 136) that are mapped to one or more of the read-only tables 140.

The shared container 108 can include one or more (a plurality, as shown) of shared-access tables ("write" or "shared" type tables) 146. The shared-access tables 146 include data elements 150 (typically, particular records or particular attributes) that can be modified by a tenant 112, 114 (and, in some cases, also by an owner of the shared container 108). The shared-access tables 146 also includes data elements 152 that are not modifiable by a tenant 112, 114 (e.g., they may only be modified by an owner of the shared container 108).

As explained above, various techniques can be used to indicate which data elements are owned by the shared container 108 and which are owned by the tenants 112, 114. These techniques can include designating primary key ranges as associated with the shared container 108 or the tenants 112, 114, defining SQL statements to identify tenant or shared container data (e.g., via WHERE statements), placing indicators in one or more of the data dictionaries 132, 134, 136, or using another technique or algorithm. In at least some cases, the shared-access tables 146 can include values for the data elements 150. These values can represent default values that are initially populated to a tenant-local table 162, 164, or which are read by the tenants 112, 114 (e.g., via a view) until the values are modified by the tenant.

At the tenants 112, 114, respective tenant containers 116, 118 can include views 156, 158 that are mapped (read-only) to shared container data 152 in the corresponding shared-access table(s) 146. The tenant containers 116, 118 include local tables 162, 164 corresponding to a respective table 146. The tenants 112, 114 can write data to the local tables 162, 164. Data can be read from the local tables 162, 164 and the shared access table 146 of the shared container 108 via union views 168, 170.

The tenant containers 116, 118 can include one or more local tables 174, 176. The tenants 112, 114 typically have full read/write access to the local tables 174, 176. In at least some cases, data in the local tables 174, 176 is not accessible via the shared container 108, and is not typically accessible by other tenants.

Example 3

Example Materialization of Materializable Table

Figure 2A:
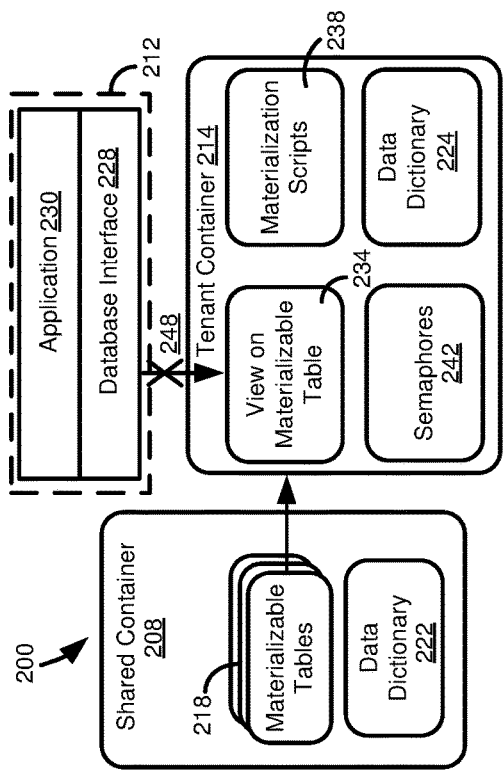
FIGS. 2A-2D are diagrams schematically depicting a process for materializing a materializable table in a tenant container.

FIGS. 2A-2D illustrate how a database table having a sharing type of "materializable" can initially be accessed in a read-only manner via a database view, and can be instantiated at a tenant when a write request is made. FIG. 2A illustrates a database environment 200 that includes a shared container 208 and a tenant 212 associated with a tenant container 214. Although a single tenant 212 is shown, it should be appreciated that the environment 200 can accommodate a plurality of tenants, as desired.

The shared container 208 includes one or more (a plurality, as shown) materializable tables 218. Although not shown, the shared container 208 can include other types of tables, such as shared-access tables or read-only tables, as shown in the multitenant database environment 100 of FIG. 1. Similarly, although not shown, the tenant container 214 can include tenant-local tables, a tenant portion of shared-access tables, union views for shared-access tables, and views that are mapped to read-only tables of the shared container 208. The shared container 208 and the tenant container 214 include respective data dictionaries 222, 224.

The tenant 212 includes a database interface 228 and an application layer 230, which can be at least generally similar to the database interface 126 and the application layer 122 of FIG. 1. At least a first materializable table 218 is first deployed in a non-materialized state. That is, the materializable table 218 has all of the data maintained in a read-only state, with respect to the tenant 212, on the shared container 208. The tenant 212 can access the data in the materializable table 218, in a read-only manner, via a database view 234, which can be defined in the data dictionary 224.

The tenant container 214 can include other features, such as a store 238 of materialization scripts, or procedures. The store 238 can be called when a materializable table 218 is to be materialized in the tenant container 214. In other embodiments, the materialization scripts or procedures can be stored in another manner, such as being stored in, or accessed via, the data dictionary 224. The tenant container 214 can further include semaphores 242. The semaphores 242 can be used to indicate whether a particular materializable table 218 is in the process of materialization. In other embodiments, the semaphores 242 can be stored in another manner, such as being stored in an entry in the data dictionary 224 for the materializable table 218.

Although semaphores 242 have been described, any suitable resource use indicator can be used, such as a flag, locking protocol, mutex, etc. These resource use indicators can be used to prevent a materialization process from being initiated multiple times for the same materializable table 218 (e.g., when a second write request from the tenant 214 is intercepted, but the table has not yet been materialized as a result of an earlier write request).

Figure 2B:
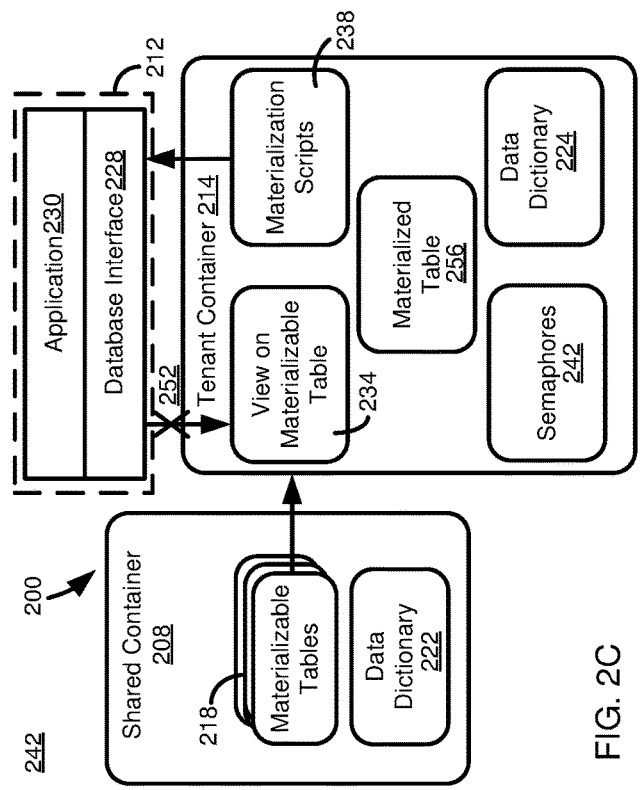

FIG. 2B illustrates a write request 248 having been intercepted, such as by the database interface 228. For example, the write request 248 may generate a SQL error or exception. The error or exception can be caught by the database interface 228. Instead of returning an error, such as to the application layer 230, the database interface 228 can call the appropriate materialization procedure in the store 238. The write request 248 can be reexecuted after the materialization process has completed. As part of the materialization process, a resource use indicator can be set to indicate that the materialization of the materializable table 218 has been initiated. For example, a semaphore 242 can be set to 1.

Although this Example, and other Examples, disclose materialization when a write operation is received, in other cases materialization can occur upon other events. For example, materialization can occur when a tenant seeks to modify table metadata, such as to add a field or alter other table metadata. Unless indicated otherwise, the term "write" in the context of triggering table materialization is intended to embrace both DML statements that modify table data and DDL statements that modify table metadata.

Further, in some cases, a materialization process can be triggered in ways other than modification attempts by a tenant. As discussed in further Examples, materialization can occur as part of a change in sharing type in an update or upgrade process. Or, materialization can be triggered based on performance metrics, such as if it is determined that a materializable table is being accessed frequently (such as number of access operations, or access operations over a time period, exceeding a threshold) or if read operations from the shared container are slower than a threshold. That is, in some cases, read performance from a shared container can be slower than from a tenant-local table, and so a table can be materialized, automatically or manually, in order to improve performance. Tables materialized by any means (e.g., DDL operations, DML operations, manual materialization, or automatic materialization as a result of a performance trigger) can be logged, and can be used to help determine future default sharing types, such as to improve performance for other tenants.

Figure 2C:
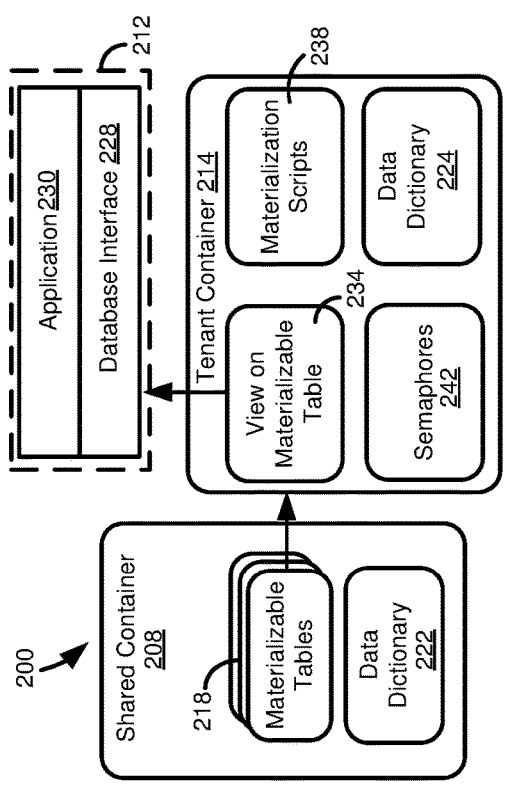

FIG. 2C illustrates the database environment 200 after the materialization process has been initiated. At this point, the tenant container 214 still includes the view 234 on the materializable table 218 at the shared container 208. Read requests from the tenant 212 can be processed with the view 234 until the materialization process is complete. If additional writes 252 are received, the database interface 228 can determine that the materialization process has already begun via the semaphore 242. The additional writes 252 can be stored, such as in a queue or other data structure, until the materialization process is complete (e.g., the queue can be emptied when the materialization process is complete). Storing the writes 252 in a data structure can help ensure that writes are applied in the correct sequence when the materializable table 218 is materialized in the tenant container 214.

The tenant container 214 is shown as including a materialized table 256, a tenant-local version of the materializable table 218. At this point, the materialized table 256 is in the process of being created, or the data dictionary 224 has not been updated to reference the materialized table 256 rather than the view 234.

Figure 2D:
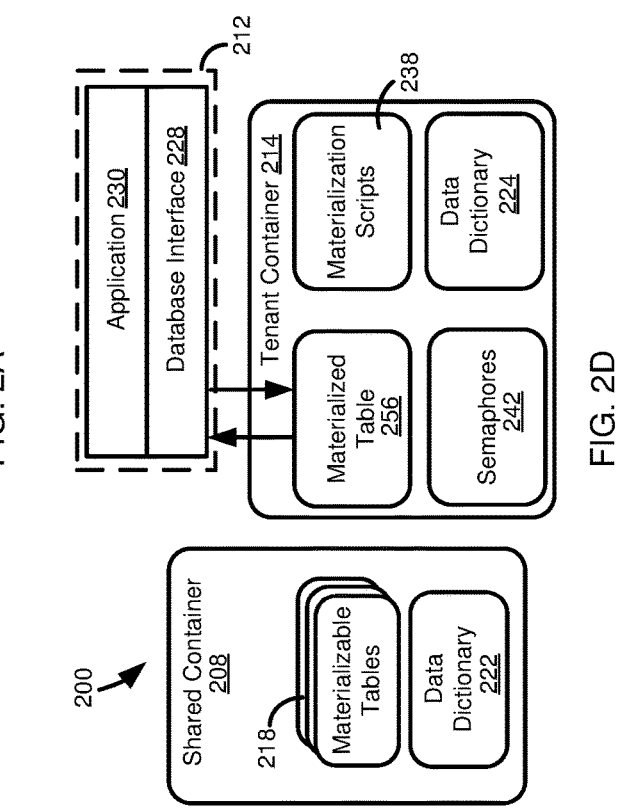

FIG. 2D illustrates the database environment 200 upon completion of the materialization process. The view 234 has been dropped, and instead the data dictionary 224 references the materialized table 256. The materialized table 256 is available for both read and writes from the tenant 212. Any writes 252 that were received during the materialization process, as well as the original write 248 triggering the materialization process, can be replayed. The semaphore 242 can be set to 0. Other changes can be made to the database environment 200. For example, an entry, such as in the data dictionary 222, can indicate that the materializable table 218 has been materialized for this tenant.

Example 4

Example Materialization Instructions

Figure 3:
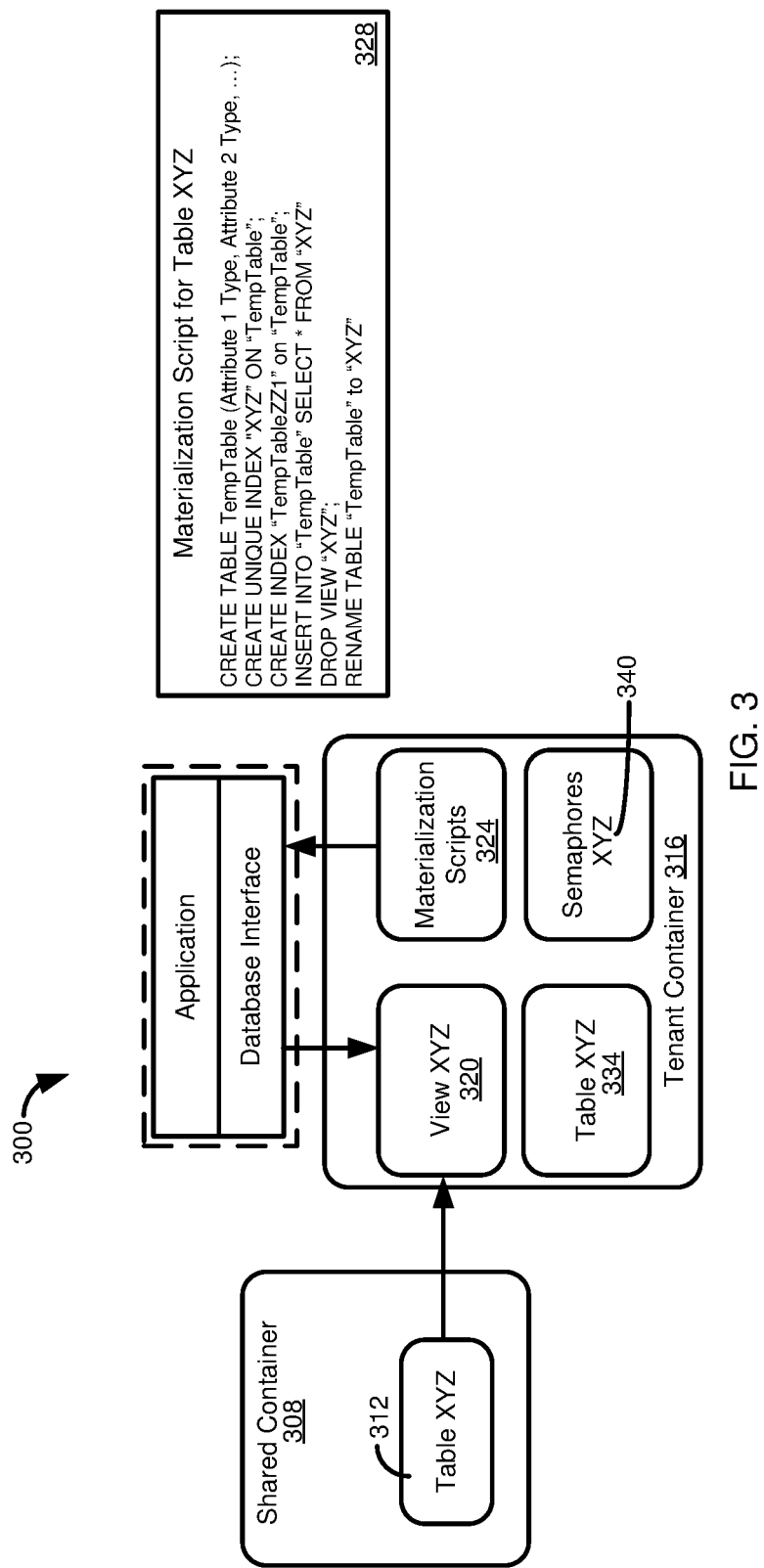
FIG. 3 is a diagram depicting how a stored materialization script or procedure can be called to materialize a materializable table in a tenant container.

FIG. 3 illustrates a database environment 300 that demonstrates how a materialization instructions, such as in a script, or procedure, can be associated with a materializable table and executed when a request to write to a currently un-materialized table is received. The database environment 300 includes a shared container 308 having a materializable table 312, table XYZ. Materializable table 312 is currently not materialized in a tenant container 316. The materializable table 312 can be accessed in a read-only manner using a view 320 defined in the tenant container 316.

A store 324 can store a materialization script 328 for materializable table 312. The materialization script 328 includes instructions for creating a materialized table 334. The materialized table 334 is originally created having a temporary name, having the structure (e.g., fields and optionally other metadata) of the materializable table 312. One or more indices can be created for the materialized table 334. Data can be copied from the materializable table 312 to the materialized table 334. Once the data has been copied, the view 320 can be dropped. With the view 320 dropped, the materialized table 334 can be renamed to have the same name as the view/materializable table 312.

As discussed in Example 4, a use indicator, such as a semaphore 340 can be set to indicate that the materialization script 328 is being executed. In this way, multiple write attempts will not trigger multiple materialization processes. Write requests received during the materialization processes can be queued and executed on the materialized table 334 once the materialization process has completed.

Although this Example 4 describes materialization instructions being pre-calculated and stored for specific database objects (e.g., tables and views), in other aspects, materialization instructions can be determined and applied in another manner. For example, a materialization method can be called, where the materialization method determines materialization instructions based on metadata (e.g., a schema) associated with the database object. Similarly, changes in a schema of a database object, or changes in sharing types, can be calculated on the fly based on appropriate schema data. In at least some cases, materialization (or other) instructions calculated on the fly can be the same as, or at least carry out equivalent operations, as the stored instructions described above.

Example 5

Example View Update on Table Materialization

The processes described in Examples 2-4 were described with respect to materialized tables. The described processes can be extended to reconfigure database views on a materialized table and one more additional database tables or other objects (e.g., other views).

Figure 4A:
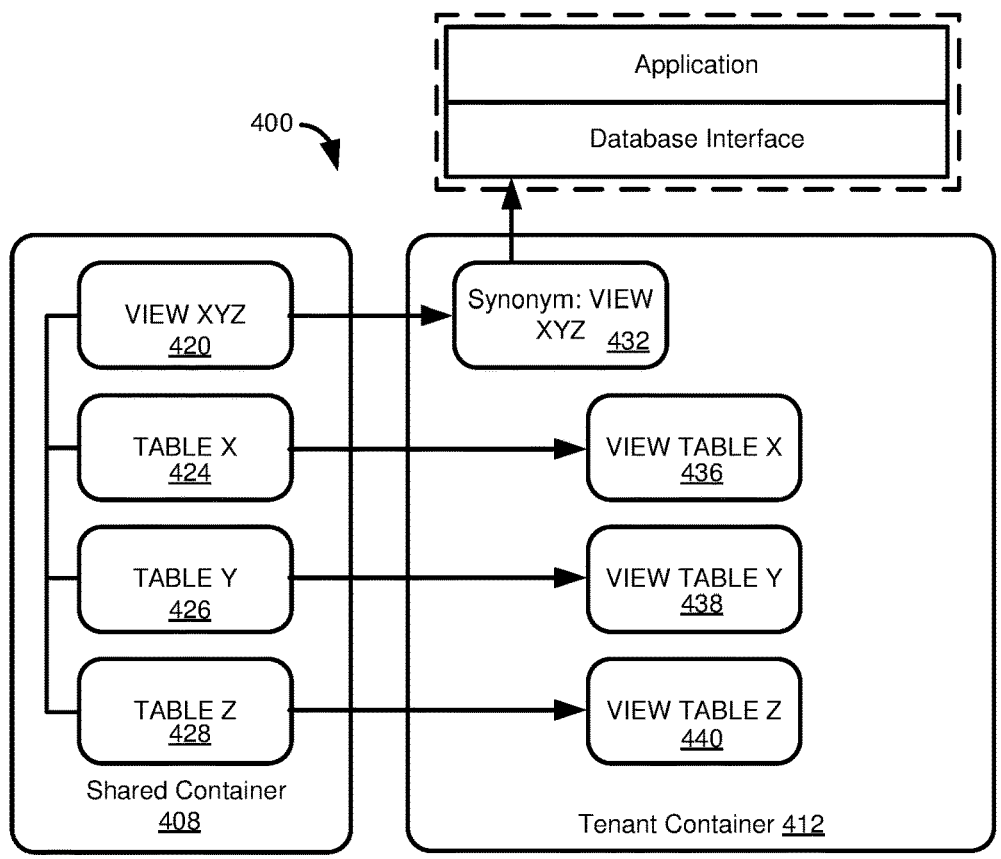
FIGS. 4A and 4B illustrate how a view defined in a tenant container that references a materializable table in a shared container can be replaced by a view that references a materialized table in the tenant container.

FIG. 4A illustrates a database environment 400 that includes a shared container 408 and a tenant container 412. Although a single tenant container 412 is shown, the database environment 400 can include a plurality of tenant containers (for each of a plurality of tenants).

The shared container 408 includes a view 420. The view 420 is defined on three tables 424, 426, 428 of the shared container 408. At least one of the tables 424, 426, 428 is a materializable table. In the described example, table 428 is a materializable table. The other tables 424, 426 can be materializable tables, shared tables, or read-only tables.

In the database environment 400 of FIG. 4A, the tenant container 412 includes a synonym view 432 that references the view 420 of the shared container 408. As configured, the synonym view 432 provides read-only access to the tables 424, 426, 428 through the view 420. Optionally, the tenant container 412 can include views 436, 438, 440 mapped, respectively, to the tables 424, 426, 428.

Figure 4B:
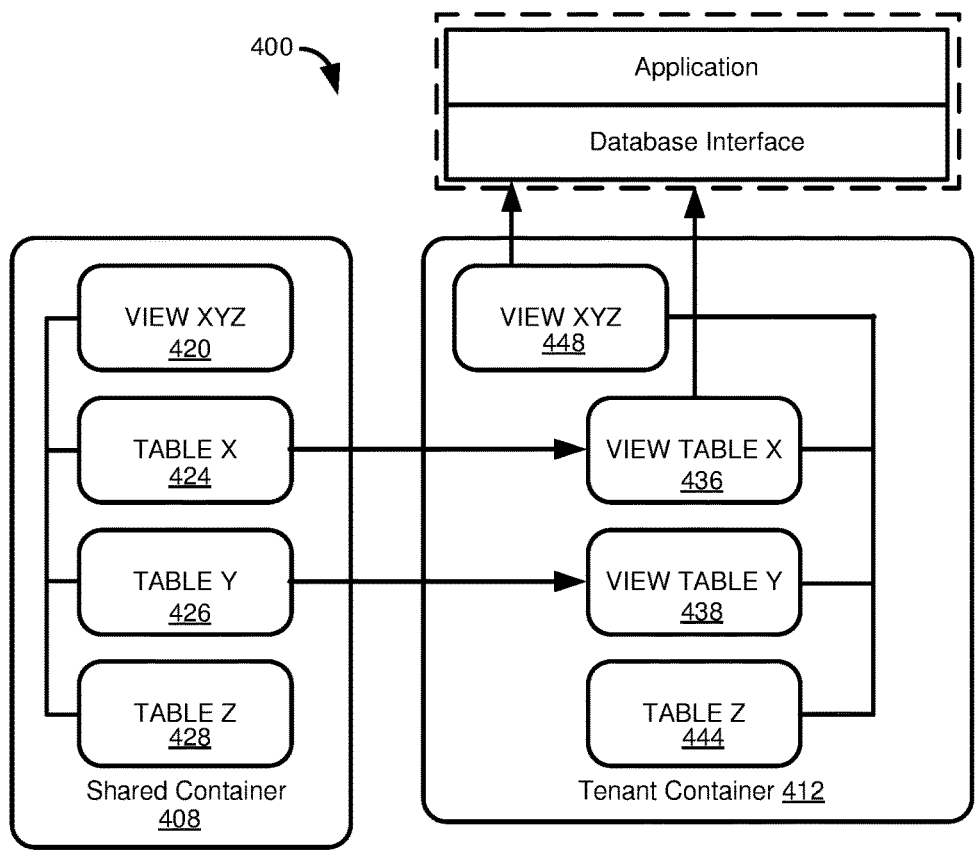

FIG. 4B illustrates the database environment 400 after table 428 has been materialized to the tenant container 408 as table 444, such as after an attempt to write to the table 428. The process of materializing the table 428 can be analogous to that described with respect to Examples 2-4. However, the materialization process includes operations for replacing the view 432 with a view 448 that references the materialized table 444. The views 436, 438 can be created if they did not previously exist.

As the view 420 references the table 428, the view 420 would not include any modifications made by the tenant associated with the tenant container 412 to the materialized table 444. Accordingly, the view 448 references the materialized table 444. The remaining components of the synonym view 432 are incorporated into the view 448 by referencing the views 436, 438 to the tables 424, 426 of the shared container 408.

If another of the tables 424, 426 was indicated to be materialized, the view 448 can be updated to reference a materialized table in the tenant container 416, in a similar manner as the materialized table 444.

Example 6

Example Metadata

FIG. 5 illustrates an example table 500 for holding metadata related to database objects, such as views and tables. The example table 500 can be, or can be included in, a data dictionary or another metadata repository.

The table 500 includes a field 508 for storing a name or other identifier of a database object. Typically, each name in the field 508 is unique. So, a database table and a database view typically will not have the same name. As described in Example 5, when a view or table is to be replaced, a temporary object (e.g., an object with a temporary name that will later be changed) may be instantiated. After instantiation, including, in at least some cases, copying data, the original named object can be dropped. After the original named object is dropped, the temporary object may be renamed with the name of the original, dropped object. Thus, changes in the database system (e.g., changes in a shared container, a tenant container, or both) can be abstracted from higher-level components (e.g., an application).

The table 500 includes a field 512 for an object type. Object types can include tables or views. As explained in Examples 2-4, in some cases, a table can have portions, with respect to a particular tenant, that are read-only in the shared container, and other portions for which the tenant has read/write access and are stored in a table in the tenant container. The table 500 can include a field 516 that includes key ranges that are associated with the tenant (although ownership could be specified in another manner, such as specifying records that are owned by the shared container).

The table 500 can include a field 520 that includes a sharing type flag or indicator. The indicators in the field 520 can determine whether a particular object (e.g., associated with a name 508) is a materializable object ("M"), a read-only object ("R"), a local object ("L"), or a shared-access object ("W"). Objects having a "materializable" sharing type can be associated with an entry in a field 524 that indicates whether the table has been materialized in the particular tenant container associated with the table 500. If the flag is not set, such as in entry 526, it can indicate that the table has not been materialized and is still accessed on a read-only basis via a view in the tenant container. If the flag is set, such as in entry 528, it can indicate that the table has been materialized, and is accessed for both read and write operations on the tenant container.

In some cases, the table 500 includes materialization indicators 524 and sharing types 520 for views that are based on materializable tables in a shared container. This can be useful, for example, when the table 500 only includes a single entry for each object name, and so the table may not include an entry for a materializable table until the table has been materialized and has replaced a view with the same name.

Objects having a "materializable" sharing type can also be associated with a materialization process field 532. The materialization process field 532 can store flags indicating whether a materialization process has been initiated. Thus, the field 532 can serve as the usage indicator/semaphore for the process described in Example 3. After an exception is generated in response to an attempted write to a non-materialized table, before materialization is initiated, a software component can check the table 500 to determine if the corresponding flag has been set in the materialization process field 532. If so, another materialization process is not started, and the write can be held and executed once the materialization process is complete. If the flag is not set, a materialization process can be initiated.

The table 500 can include more or fewer fields than shown. Or, fields can be implemented in a different manner than shown. For instance, the table 500 can include field definitions (e.g., attribute names and associated data types) for a particular database object. In some cases, a default table sharing type, such as materializable, can be indicated by a lack of a sharing type indicator (e.g., including no value for the field or a NULL value).

One or more of the fields of the table 500 can be combined, such as combining the materialization process field 532 with the field 524 indicating whether a table has been materialized. Field 540 can include entries indicating whether a table has been materialized, has not been materialized, or materialization is pending. Thus, the field 540 can be used as a resource usage indicator/semaphore.

The table 500 can include a field 544 that includes a stored procedure/script to be executed when a table is to be materialized (or a view altered that includes a materializable table). In another implementation, a field 548 can include a location (e.g., a URI) where a materialized stored procedure/script is located. When a request to write to a non-materialized table is intercepted (e.g., by an error handling routine), the materialization procedure can be called from the location specified in the field 548 and executed.

Example 7

Example Switching Between Shared Containers

In some cases, it may be desired to change the schema of a multitenant database system. For example, it may be desired to alter the structure of one or more tables. Or, it may be desired to change the sharing type of one or more tables. If the changes involve database objects located on a shared container, an update can be carried out using the database environment 600 shown in FIG. 6.

The database environment 600 includes a first, original, shared container 610, a tenant container 612, and a second, new, shared container 614. The first shared container 610 can include one or more materializable tables 618 (which may or may not be materialized in the tenant container 612), one or more read-only tables 620, and one or more shared-access tables 622. Although not shown, the shared container 614 can include other database objects, such as views that can be accessed by the tenant container 612 (for example, via synonym view).

The tables 618, 620, 622 can be accessed by views 632 of the tenant container 612, or can have a counterpart table 630 in the tenant container. The tables 630 can include local tables, materialized tables, or tables corresponding to tenant-owned data of a shared-access table 622. The views 632 can be views on tables 618, 620, or 622, or can be synonym views for views on the original shared container 610. The tenant container 612 can also include local views 634.

During an update process, updates can be reflected in the new shared container 614. The new shared container 614 can include materializable tables 640, read-only tables 642, and shared-access tables 644. Although not shown, the new shared container 614 can include other database objects, such as views. Changes can be made to the tenant container 612 to reference database objects in the new shared container 614, or to otherwise accommodate changes in the structure of the database system. For instance, local tables 650 can be created. Local tables 650 can represent materializable tables 618, read-only tables 620, or shared-access tables 622 that are local tables in a new database schema. Or, the local tables 650 can represent tenant-owned data in a shared-access table 644 of the new shared container 614, which may have been a read-only table 620 or a materializable table 618 in the first shared container 612.

Views 652 can also be created in the tenant container 612. The views 652 can be union views for a materializable table 618 or a read-only table 620 that was converted to a shared-access table 644 in the new shared container 614. In the case where the view 652 is union view, the view can access one of the newly created local tables 650 and one or more additional views of the added views 652, such as a view that reads shared-container owned data of a shared-access table 644. Local views 654 can also be added to the tenant container 612.

Figure 6:
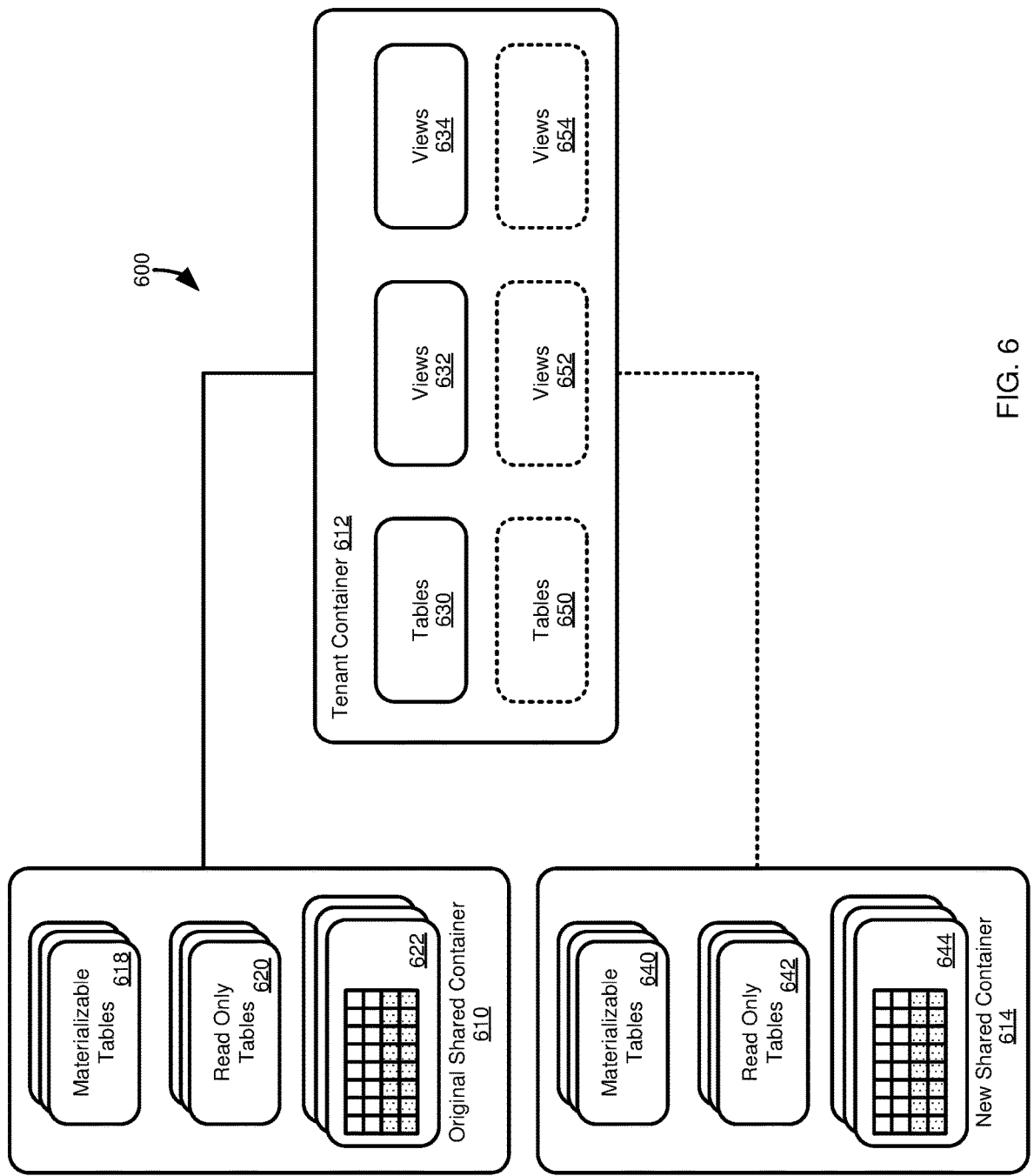
FIG. 6 illustrates how a tenant container can be updated to reference a new shared container in place of an original shared container.

Although not depicted in FIG. 6, an update process can remove or modify one or more of the tables 630, views 632, or local views 634. For example, a table 630 or view 632, 634 can have its schema altered. Or, a table 630 or a view 632 can be removed based on a change of a sharing type of a table, such as removing a materialized table, a local table, or a table holding tenant-owned data of a shared-access table 622.

Once an update process is complete, the original shared container 612 can be deleted. In addition, any tables 630 or views 632, 634 of the tenant container 612 can be dropped that are no longer needed. Updating the database environment 600 using the new shared container 614 can provide a number of advantages. For example, the new shared container 614 can have a different namespace than the original shared container 612, which can allow data objects to be created that have the same name as in the original shared container and which can be referenced by the tenant container 612 when the update process is complete. Thus, references to the original shared container 610 on the tenant container 612 do not need to be modified to access the new shared container 614 once the new shared container has been activated. In addition, the use of the second shared container 614 can reduce downtime for a tenant associated with the tenant container 612, as the tenant can continue to use the original shared container 610 until the new container is ready to be activated.

In at least some cases, data can be written to materializable tables during an update. If the data is determined to apply to tenants, generally, it can be written to the materializable table in the shared container (and access by tenants having a view instead of a materialized table). If the table has been materialized for a particular tenant, it can also be written to the materialized table in the appropriate tenant containers.

For tenant-specific data, data to be written can be written by an application that also reads tenant data. If the application determines that the tenant has not modified the data, such as all tables being read-only or non-materialized tables (i.e., a view on the materializable table), no action need be taken. That is, the update can be carried out on the shared container and no tenant-specific action need be taken if the tenant has not modified any data. If the data being read is modified by the tenant, the write can be processed using any tenant-modified data. In the case of a materializable table where a write is received from a tenant during an update process, before the write is processed, the table can be materialized in the client container.

Example 8

Figure 7A:
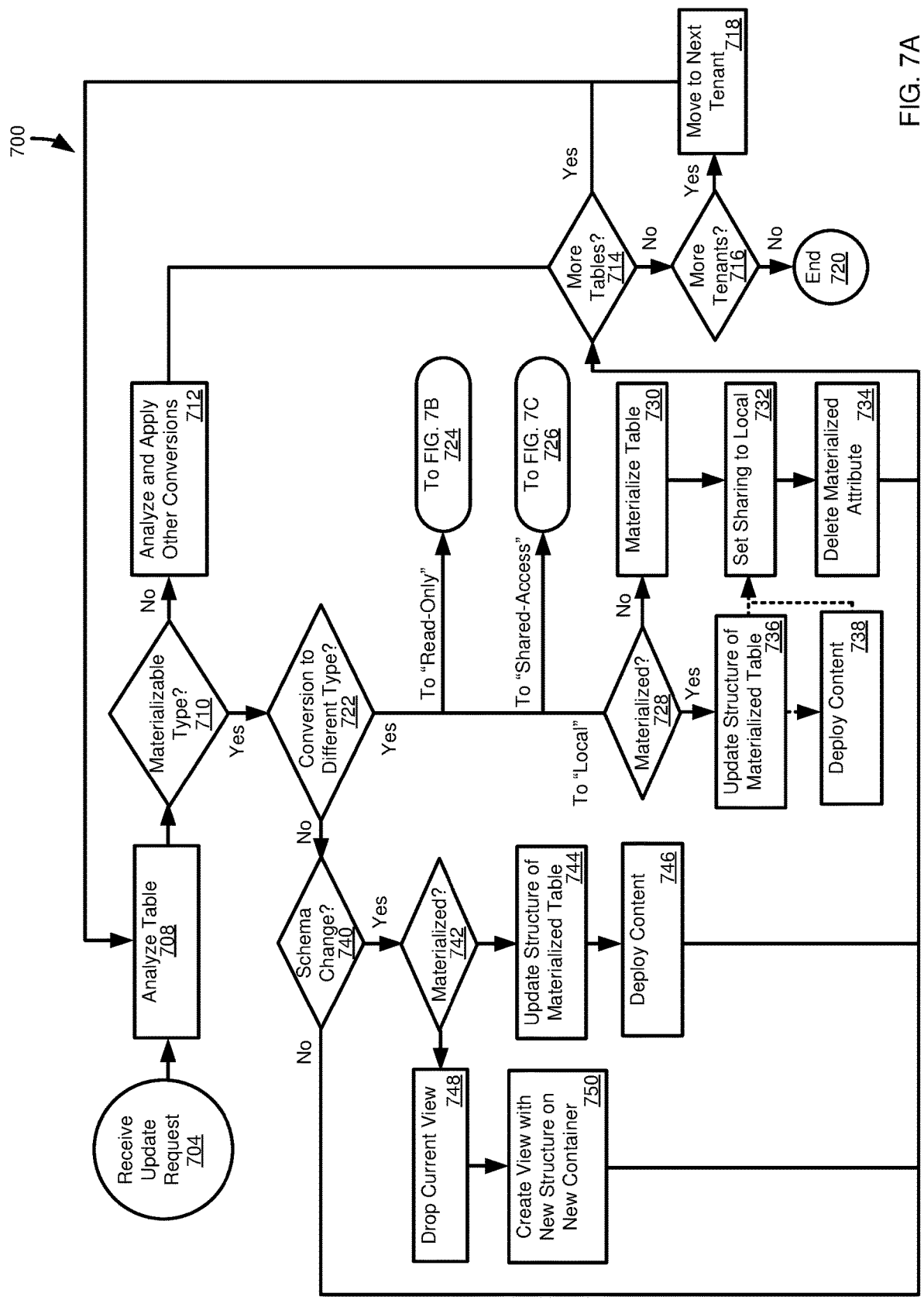

Example Operations for Updating Table Metadata or Schema, Including Sharing Type FIGS. 7A-7C illustrate flowcharts of operations 700 that can be carried out in converting a table from a first format to a second format. The operations 700 can be carried out using the database environments depicted in FIGS. 1-4 and 6 and can employ the metadata table 500 of FIG. 5.

With reference first to FIG. 7A, operations 700 are shown for changing the sharing type of a database object, such as a table or view. At 704, an update request is received. In some cases, requests can occur on an intermittent basis, such as in response to a request by a database administrator (for example, a database administrator with access rights to modify a shared container in a multitenant environment). In other cases, the request at 704 can be a request to execute the operations 700 as part of an upgrade or conversion process. For instance, an upgrade or update to a database system may result in changes to the sharing type of database tables, other changes to database objects (e.g., other schema changes), or the addition or removal of database objects from a shared container, a tenant container, or both. As part of the upgrade or update process, one or more tenant containers can be analyzed for tables whose sharing type has changed, and appropriate changes can be made to the tenant container, as further described.

At 708, a first table of a tenant container is analyzed. At 710, it is determined whether the first table has a sharing type of "materializable." If not, the table can be processed at 712 using techniques for converting between other table types (e.g., local to read-only, local to materializable, local to shared-access, read-only to shared access, read-only to local, read-only to materializable, shared-access to read-only, shared-access to local, or shared-access to materializable), or the table can be skipped if it is not changing sharing type. After any other operations are carried out, it can be determined at 714 whether any additional tables are to be analyzed for the tenant. If so, the process can return to 708 to analyze a next table. If not, it can be determined at 716 whether more tenants are to be analyzed. If so, the operations 700 can move to the next tenant at 718 and then return to 708 for a first table of the next tenant. If no more tenants are to be processed, the operations 700 can end at 720.

If it is determined at 710 that the sharing type of the table is "materializable," it is determined at 722 whether the table is being converted to a different type. If the table is being converted to a read-only table, at 724, the operations 700 proceed with reference to FIG. 7B. If the table is being converted to a shared-access table, at 726, the operations 700 proceed with reference to FIG. 7C.

If it is determined at 722 that the table is being converted to a local table, it is determined at 728 whether the table has been materialized. If the table has not been materialized, it can be materialized at 730. Materialization can be carried out, for example, as described in Examples 2-7. After the table is materialized, at 732, its sharing type (e.g., as indicated in metadata, such as in a data dictionary) can be changed to "local." The "materialized" attribute can be deleted from the metadata for the table at 734. The operations 700 can then proceed to 714 to determine if more tables are to be processed.

If it is determined at 728 that the table has been materialized, optionally, at 736, the structure of the materialized table can be updated to a new schema. However, in some cases, a table can be changed from a materializable type to a local type (or, more generally, any sharing type to any other sharing type) without a change in schema (other than the sharing type), in which case the operations 700 can proceed to 732. After an update to the schema, if any, the operations 700 can proceed to 738 where new content is deployed to the materialized table in the new schema. After deploying the content, or if no new content is to be deployed, the operations can proceed to 732.

If it is determined at 722 that the table is not being converted from "materializable" to a different sharing type, it is determined at 740 whether the schema for the table is being changed. If not, the table is not being changed, and the operations 700 can proceed to 714. If the schema is being changed, it is determined at 742 whether the table has been materialized in the current tenant container.

If it is determined at 742 that the table has been materialized, the structure of the table on the tenant database is altered at 744. Optionally, at 746, any new content is deployed to the copy of the table on the tenant container. In at least some cases, content deployed to the tenant container relates to records or fields not present in a prior version of the table, so as not to overwrite data changes made by the tenant. In further cases, a table can include flags or other status indicators indicating whether a particular record or field has been modified by a tenant, and data can be deployed to the table for new fields or new records, as well as existing records or fields that have not been modified by the tenant. However, in some cases, even tenant modifications can be overwritten as part of an update process. Deploying content at 738 can be omitted, in some aspects. After any content is deployed at 746, operations 700 can proceed to 714.

If it was determined at 742 that the materializable table was not materialized in the tenant container, a view on the current materializable table of the current shared container can be dropped at 748. A new view having a new structure and using a new version of the materializable table in a new shared container is created at 750. The operations 700 can then proceed to 714.

With reference to FIG. 7B, a portion of the operations 700 are shown for converting a table of "materializable" sharing type to a "read-only" sharing type. The operations 700 begin at 752 from 724 of FIG. 7A. It is determined at 754 whether the table has yet been materialized. If the table has been materialized, the table can be dropped at 756, such as from a data dictionary of the tenant container. A view on the corresponding table of a shared container is created at 758. The sharing type of the view is set to "read only" at 760. At 762, the operations 746 can then return to 714 of FIG. 7A.

In some cases, prior to dropping the table at 756, it can be determined whether the table has been modified by the tenant. If the tenant has modified the data, modified data can be moved to another table prior to dropping the table at 756. Modified records or other table modifications can be indicated, for example, by setting a "dirty" bit or flag for the associated modified or added data.

A checksum can be used to determine whether a table has been modified (e.g., a checksum of a tenant version of the table can be compared with a checksum for a shared-container version of the table). In a particular example, row counts can be determined for two tables. If the row counts do not match, a table has been modified. If the row counts match, and are zero, the tables can be determined to be identical. If the row counts match, but are greater than zero, checksums on the tables' contents can be calculated and compared. If the checksums are equal, the tables are identical, and different otherwise.

If it was determined at 754 that the table was not materialized, a view on the materializable table in the current shared container can be dropped at 764. The operations 700 can then proceed to 758.

FIG. 7C illustrates a portion of the operations 700 for converting a table of "materializable" sharing type to a shared-access (or "write") type. The operations begin at 766 from 726 of FIG. 7A. It is determined at 768 whether the table has been materialized. If the table has been materialized, a new tenant table is created at 770 to hold tenant-local data of the shared table. At 772, data corresponding to tenant-owned fields of the shared access table created at 770 is copied to the shared access table from the materialized table. As described above, tenant-owned data can be indicated in various manners, including specifying such data via a key-range or defining the data via query language statements (e.g., a SELECT statement).

Once any content has been copied, the materialized table can be dropped at 774. A view on the shared container-owned data can be created in the tenant container at 776. At 778, a union view is created that accesses the tenant table created at 770 and the view created at 776. The operations 700 can then proceed, at 780, to 714 of FIG. 7A.

If it was determined at 768 that the table was not materialized, a new tenant table is created at 782, analogous to table creation at 770. Data from the shared container can be accessed via the existing database view of the tenant container and copied to the newly created tenant table at 784, using a definition of tenant-owned data. At 786, the view on the table of the shared container can be dropped. The operations 700 can then proceed to 776.

Although not illustrated in FIGS. 7A-7C, in some cases, a database object can be changed to a materializable type from another sharing type. In the case of a local table in a tenant container, if the change is to a materializable type having a materialized table, the sharing type can be changed in metadata associated with the object and a materialized attribute can be added. For a local table being changed to a non-materialized status, a materializable table can be created in the shared container, which can have the data from the local table or other data (e.g., default data for the shared container). A materialization procedure can be provided in the event the database object is to be materialized. The local table can be dropped from the tenant container, and a view can be added that references the materializable table in the shared container.

In the case of a read-only database object that is being changed to a materializable sharing type, with the table not materialized in the tenant container, the sharing type associated with a view on the object in the shared container can have its sharing type changed from read-only to materializable, and an attribute can be set indicating that the table is not materialized. A materialization procedure can be provided in the event the database object is to be materialized. If the table is be changed from read-only to materializable, with the table materialized in the tenant container, a view for a read-only table can be dropped, the table can be materialized in the tenant container, the type can be changed to materializable, and an attribute can be set indicated that the table is materialized.

In the case of a shared-access table being converted to a materializable table, with the table not materialized, tenant-owned data can be discarded or copied to a materializable table on the shared container. A view can be created on the materialized table, the sharing type changed to materializable, and an attribute set indicating that the table is not materialized. The prior union view, and optionally the view on the shared-access table (if a new view on the materializable table is created), can be dropped.

If the shared-access table is being converted to a materializable table, with the table being materialized, shared-container data and tenant-owned data can be copied to a materialized table in the tenant container. The prior view on the materialized table and union view can be dropped. The new tenant table can be indicated as materializable, and an attribute set to indicate that the table has been materialized.

Example 9

Example Materialization Operations

FIG. 8 illustrates a method 800 for materializing a table in a tenant container when a write request is received for a read-only data object of the tenant container. At 808, a request from a tenant is received to write data to a first database table of a shared container. The first database table is accessible to the tenant container using a view defined in the tenant container. A message, such as an error or exception message, is received at 812 indicating that the first database table is in a read-only state (e.g., the tenant container has read-only access to the first database table located in the shared container).

At 816, metadata is accessed for the first database table, which can be metadata located on the tenant container for the view. In particular examples, the metadata can be stored in a data dictionary of the tenant container. It is determined at 820 that the first database table has a materializable sharing type (e.g., by inspecting a sharing type indicator for the view or table in the data dictionary). At 824, a procedure is called to materialize the first database table in the tenant container. In some cases, a materialization procedure can be stored in, or accessed through (e.g., by a path or location indicator), an entry in the data dictionary or other metadata repository. A second database table is created in the tenant container corresponding to the first table, at 828, by executing the materialization procedure. At 832, data is copied from the first database table to the second database table. The first view is replaced with the second database table at 836. In a particular example, the first view can be dropped from the data dictionary and the second database table can be given the name formerly held by the view. At 840, the data is written to the second database table.

Example 10

Example Schema Update Operations

FIG. 9 illustrates a flowchart of operations 900 for updating a table schema of a table having a materializable sharing type. At 908, first DDL statements for updating an instance of a first table having a materialized state are stored. Second DDL statements for updating an instance of the first table having a not-materialized state are stored at 912. At 916, for a first tenant container, a materialization status is determined of a first instance of the first table. At 920, the first or second DDL statements are executed based on the determining. In other aspects, the DDL statements for updating table instances are not pre-calculated and stored. Rather, the DDL statements can be calculated and applied on the fly based on metadata describing a schema change.

Example 11

Example Operations in Changing Sharing Type

Figure 10:
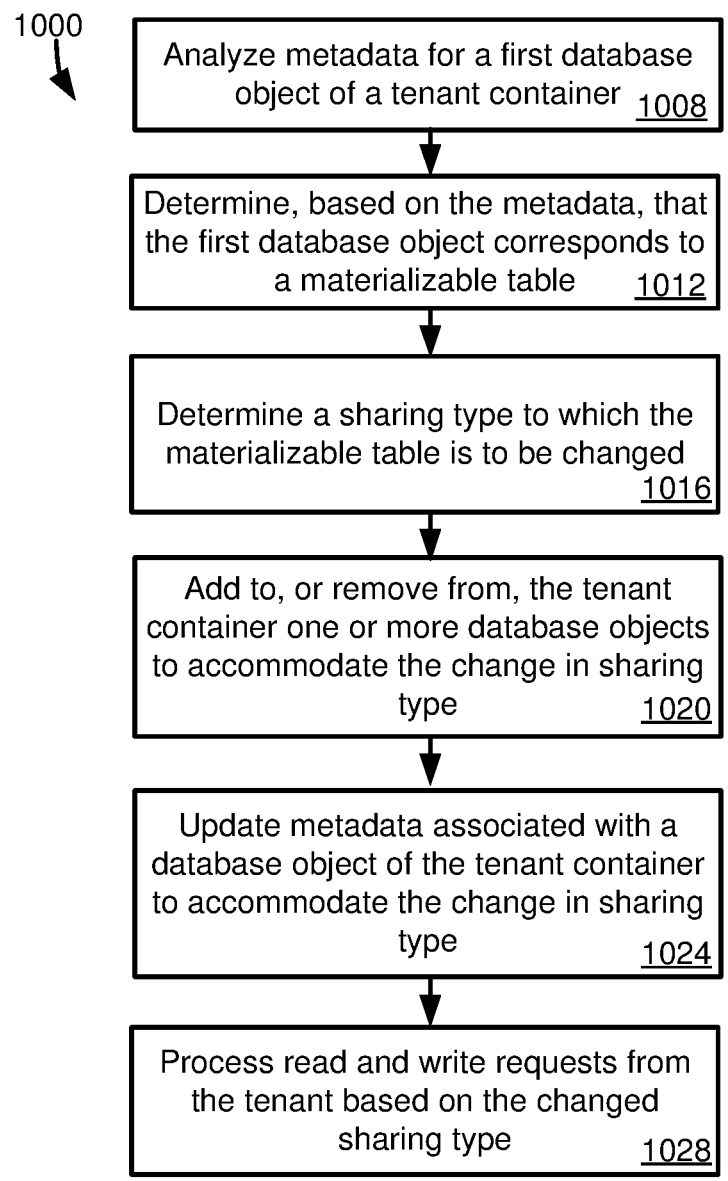
FIG. 10 is a flowchart of operations in changing a materializable table to another sharing type.

FIG. 10 illustrates a flowchart of operations 1000 for changing a sharing type of a materializable table. At 1008, metadata is analyzed for a first database object of a tenant container. Based on the metadata, it is determined at 1012 that the first database object corresponds to a materializable table, such as being a materialized table or a view on a non-materialized table located in a shared container in a multitenant database environment. At 1016, a sharing type is determined to which the materializable table is to be changed. One or more database objects are added to, or removed from, the tenant container at 1020 to accommodate the change in sharing type. At 1024, metadata associated with a database object of the tenant container is updated to indicate the change in sharing type of the materializable table. Read and write requests for the tenant are processed at 1028 based on the changed sharing type.

Example 12

Computing Systems

Figure 11:
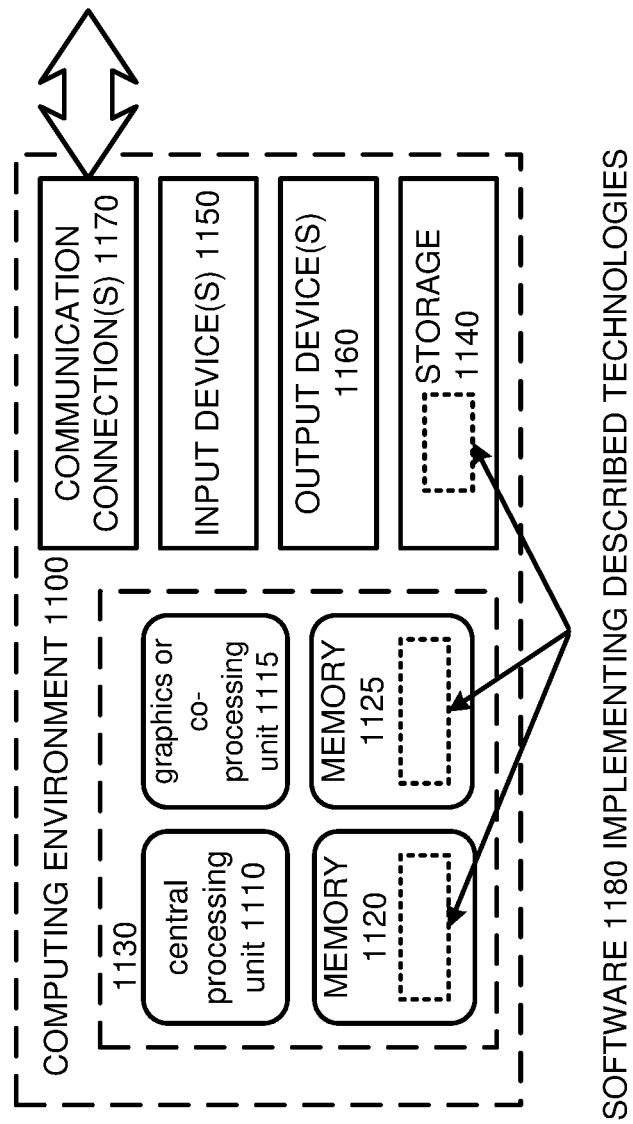
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing the features described in Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140, one or more input devices 1150, one or more output devices 1160, and one or more communication connections 1170, including input devices, output devices, and communication connections for interacting with a user. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13

Cloud Computing Environment

Figure 12:
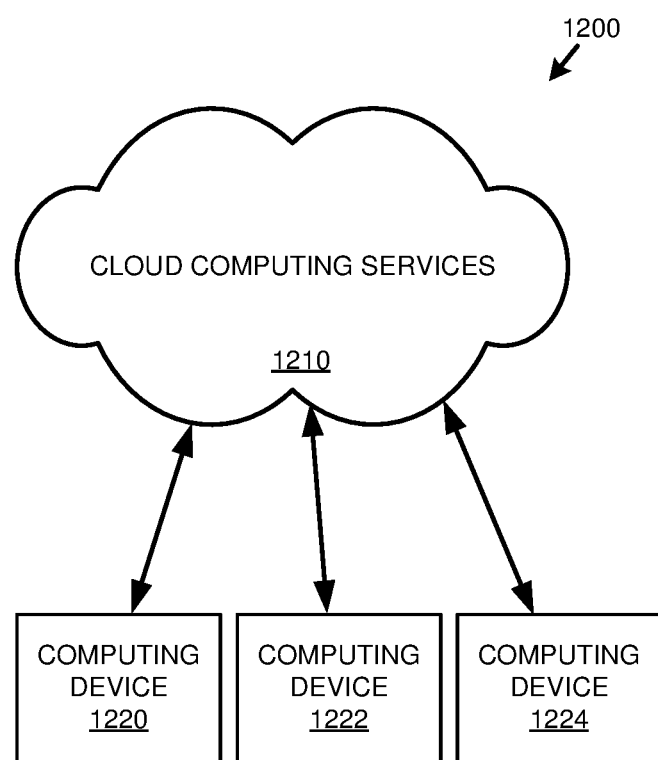
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

Example 14

Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   one or more memories;
   one or more processing units coupled to the one or more memories; and
   one or more non-transitory computer readable storage media storing instructions that, when executed, cause the computing system to perform operations comprising:
      receiving from a tenant a first request to write data to a first database table of a shared database container, the first database table being logically referenced by a first database view in a tenant database container such that the tenant may read data from the first database table by querying the first database view, the first database table having a first schema specifying one or more columns;
      receiving a message indicating that the first database table is in a read-only state;
      accessing metadata for the first database table;
      determining from the metadata that the first database table has a materializable sharing type;
      calling a procedure to materialize the first database table in the tenant database container, the procedure comprising statements in a database language to create a second database table, including statements to create the one or more columns of the first schema, the calling resulting in the creation of the second database table in the tenant database container, the second database table corresponding at least in part to the first database table, the second database table comprising a second schema, the second schema comprising the one or more columns of the first schema;
copying data from the first database table to the second database table;
replacing the first database view with the second database table; and
writing the data to the second database table.

2. The computing system of claim 1, wherein the procedure is stored in metadata associated with the first database table.

3. The computing system of claim 1, wherein the procedure is accessed via a URI stored in metadata associated with the first database table.

4. The computing system of claim 1, the operations further comprising:
indicating in metadata for the second database table that the second database table was materialized.

5. The computing system of claim 1, the operations further comprising:
after the determining, setting a resource use indicator indicating that a materialization process is pending.

6. The computing system of claim 5, the operations further comprising:
after the replacing, setting a resource use indicator indicating that the materialization process is complete.

7. The computing system of claim 5, wherein the data is first data, the operations further comprising:
receiving a second request from the tenant to write second data to the first database table;
accessing the metadata for the first database table; and
determining that the resource use indicator has been set.

8. The computing system of claim 7, the operations further comprising:
in response to determining that the materialization process is complete, writing the second data to the second database table.

9. The computing system of claim 1, wherein the first database table is referenced by a second database view in the shared database container, the first database view referencing the second database view and at least a third database table of the shared database container, the operations further comprising:
creating a third database view in the tenant database container, the third database view referencing the second database table at least a fourth database view of the tenant database container, the fourth database view referencing the at least a third database table.

10. The computing system of claim 1, wherein the second database table has a different name than the first database view and the replacing comprises:
dropping the first database view; and
renaming the second database table to have the name of the first database view.

11. The computing system of claim 1, wherein the procedure comprises instructions for the creating, copying, and replacing.

12. A method, implemented in a computing system comprising one or more hardware processors and one or more memories coupled to the one or more hardware processors, comprising:
receiving from a tenant a first request to write data to a first database table of a shared database container, the first database table being logically referenced by a first database view in a tenant database container such that the tenant may read data from the first database table by querying the first database view, the first database table having a first schema specifying one or more columns;
receiving a message indicating that the first database table is in a read-only state;
accessing metadata for the first database table;
determining from the metadata that the first database table has a materializable sharing type;
calling a procedure to materialize the first database table in the tenant database container, the procedure comprising statements in a database language to create a second database table, including statements to create the one or more columns of the first schema, the calling resulting in the creation of the second database table in the tenant database container, the second database table corresponding at least in part to the first database table, the second database table comprising a second schema, the second schema comprising the one or more columns of the first schema;
copying data from the first database table to the second database table;
replacing the first database view with the second database table; and
writing the data to the second database table.

13. The method of claim 12, wherein the statements in the database language to create the second database table comprise at least one data definition language (DDL) statement.

14. The method of claim 12, further comprising:
receiving a request to update a schema of the first database table;
determining that the first database table is in a materialized state;
in response to determining that the first database table is in a materialized state, calling a first procedure to update a schema of the second database table, wherein a second procedure comprises instructions to update the schema of the first database table when the first database table is in a non-materialized state.

15. The method of claim 14, wherein the request to update a schema results in addition of a column to, or removal of a column from, the first database table.

16. The method of claim 12, further comprising:
receiving a request to change the materializable sharing type of the first database table to a read-only table in the shared database container;
dropping the second database table;
creating in the tenant database container a read-only view of a third database table located in the shared database container;
setting a sharing type of the read-only view to indicate a read-only sharing type; and
deleting an attribute from metadata associated with the first database table indicating that the first database table was materialized in the tenant database container.

17. The method of claim 12, further comprising:
receiving a request to change the materializable sharing type of the first database table to a shared-access table, where ownership with respect to write operations is split between the shared database container and the tenant database container;
creating a third database table in the tenant database container for tenant-owned data of the shared-access table;
copying tenant-owned content from the second database table to the third database table;
dropping the second database table from the tenant database container;

creating in the tenant database container a second database view of shared database container owned data in the shared database container; and creating a union view based at least in part on the third database table and the second database view.

18. The method of claim 12, further comprising, during a process of updating a schema of the first database table:

creating a table in the tenant database container for tenant-owned data of a shared-access table;

copying tenant-owned content from the second database table to the table for tenant-owned data;

dropping the second database table from the tenant database container;

creating in the tenant database container a view of shared container owned data in the shared database container; and creating a union view based on the table for tenant-owned data and the view of shared container-owned data.

19. One or more computer readable media comprising:

computer-executable instructions that, when executed by a computing system comprising at least one hardware processor and at least one memory coupled to the at least one hardware processor, cause the computing system to receive from a tenant a first request to write data to a first database table of a shared database container, the first database table being logically referenced by a first database view in a tenant database container such that the tenant may read data from the first database table by querying the first database view, the first database table having a first schema specifying one or more columns;

computer-executable instructions that, when executed by the computing system, cause the computing system to receive a message indicating that the first database table is in a read-only state;

computer-executable instructions that, when executed by the computing system, cause the computing system to access metadata for the first database table;

computer-executable instructions that, when executed by the computing system, cause the computing system to determine from the metadata that the first database table has a materializable sharing type;

computer-executable instructions that, when executed by the computing system, cause the computing system to call a procedure to materialize the first database table in the tenant database container, the procedure comprising statements in a database language to create a second database table, including statements to create the one or more columns of the first schema, the calling resulting in the creation of the second database table in the tenant database container, the second database table corresponding at least in part to the first database table, the second database table comprising a second schema, the second schema comprising the one or more columns of the first schema;

computer-executable instructions that, when executed by the computing system, cause the computing system to copy data from the first database table to the second database table;

computer-executable instructions that, when executed by the computing system, cause the computing system to replace the first database view with the second database table; and computer-executable instructions that, when executed by the computing system, cause the computing system to write the data to the second database table.

20. The one or more computer readable media of claim 19, wherein the statements in the database language to create the second database table comprise at least one data definition language (DDL) statement.

* * * * *